United States Patent
He et al.

(10) Patent No.: US 7,006,912 B2
(45) Date of Patent: Feb. 28, 2006

(54) CYLINDER MISFIRE DIAGNOSTIC SYSTEM

(75) Inventors: Chuan He, Columbus, IN (US);
Parrish E. Ralston, Newport News, VA (US); Eric L. Hagen, Franklin, IN (US)

(73) Assignee: Cummins Inc., Columbus, IN (US)

( * ) Notice: Subject to any disclaimer, the term of this patent is extended or adjusted under 35 U.S.C. 154(b) by 233 days.

(21) Appl. No.: 10/448,378

(22) Filed: May 29, 2003

(65) Prior Publication Data

US 2004/0243296 A1 Dec. 2, 2004

(51) Int. Cl.
*G01M 15/00* (2006.01)

(52) U.S. Cl. ........... 701/111; 701/114
(58) Field of Classification Search ............ 701/111, 701/114; 73/116, 117.2, 117.3
See application file for complete search history.

(56) References Cited

U.S. PATENT DOCUMENTS

| | | |
|---|---|---|
| 5,214,958 A | 6/1993 | Inada et al. |
| 5,237,504 A | 8/1993 | Holmes et al. |
| 5,239,473 A | 8/1993 | Ribbens et al. |
| 5,278,760 A | 1/1994 | Ribbens et al. |
| 5,345,817 A | 9/1994 | Grenn et al. |
| 5,361,629 A | 11/1994 | McCombie |
| 5,487,008 A | 1/1996 | Ribbens et al. |
| 5,495,415 A | 2/1996 | Ribbens et al. |
| 5,505,079 A | 4/1996 | Rossignol |
| 5,544,058 A | 8/1996 | Demizu et al. |
| 5,574,217 A | 11/1996 | McCombie |
| 5,699,252 A | 12/1997 | Citron et al. |
| 5,728,941 A | 3/1998 | Yamamoto et al. |
| 5,732,382 A | 3/1998 | Puskorius et al. |
| 5,774,823 A | 6/1998 | James et al. |
| 5,822,710 A | 10/1998 | Mezger et al. |
| 5,875,411 A | 2/1999 | Volkart et al. |
| 5,979,407 A | 11/1999 | Want et al. |
| 6,082,187 A | 7/2000 | Schricker et al. |
| 6,112,149 A | 8/2000 | Varady et al. |
| 6,155,105 A | 12/2000 | Klenk et al. |
| 6,199,007 B1 | 3/2001 | Zavarehi et al. |
| 6,305,352 B1 | 10/2001 | Dony |
| 6,314,802 B1 | 11/2001 | Wu et al. |
| 6,334,357 B1 | 1/2002 | Moine et al. |
| 2002/0016666 A1 | 2/2002 | Maegawa |

FOREIGN PATENT DOCUMENTS

| | | |
|---|---|---|
| GB | 2310286 A | 2/1996 |
| GB | 2362219 A | 9/2000 |

OTHER PUBLICATIONS

UK Search Report dated Sep. 14, 2004 (1 sheet) for GB0410621.7.

*Primary Examiner*—Andrew M. Dolinar
(74) *Attorney, Agent, or Firm*—Barnes & Thornburg

(57) ABSTRACT

A system is disclosed for diagnosing cylinder misfiring in an internal combustion engine. A control computer is configured to periodically diagnose whether each cylinder of the engine is firing or misfiring, and to log information relating to such cylinder firing or misfiring.

45 Claims, 6 Drawing Sheets

CYLINDER MISFIRE DIAGNOSTIC SYSTEM

FIELD OF THE INVENTION

The present invention relates generally to systems for monitoring the operation of an internal combustion engine, and more specifically to systems for diagnosing cylinder misfiring conditions.

BACKGROUND OF THE INVENTION

It is desirable to monitor the operation of an internal combustion engine to determine whether any one or more of its cylinders is firing normally or if one or more of its cylinders is misfiring. It is further desirable to periodically log information relating to such cylinder firing and/or misfiring.

SUMMARY OF THE INVENTION

The present invention may comprise one or more of the following features or combinations thereof. A system for diagnosing cylinder misfiring in an internal combustion engine may comprise an engine position sensor producing a position signal indicative of an engine crankshaft position relative to a reference position, a fuel system responsive to fueling signals to supply fuel to each cylinder of the engine, and a control computer. The control computer may be configured to process the position signal to determine a number of first timing values each indicative of a contribution of a corresponding one of the cylinders to rotational speed of the engine while controlling the fueling signals to supply a first percentage of fuel to each of the cylinders. The control computer may further be configured to process the position signal to determine a number of second timing values each indicative of a contribution of a corresponding one of the cylinders to rotational speed of the engine while controlling the fueling signals to supply a second percentage of fuel to each of the cylinders. The control computer may further be configured to determine a reference timing value as a function of one or more of the number of second timing values, and to identify as firing normally any cylinder having a corresponding first timing value that deviates in a first direction the reference timing value.

The control computer may be configured to process the position signal to determine the first and second timing values for each cylinder as an elapsed time for the engine crankshaft to rotate through a predetermined crank angle. Alternatively, the control computer may be configured to process the position signal to determine the first and second timing values for each cylinder as an elapsed time for the engine crankshaft to rotate through a predetermined crank angle relative to rotation time through the predetermined crank angle for a previous cylinder in a cylinder firing order.

The control computer may be configured to determine the reference timing value as one of, or as a function of one or more of, the second timing values. In one embodiment, for example the control computer may be configured to determine the reference timing value as either an average of, or a predetermined percentage of the average of, at least two of the second timing values, wherein the at least two of the second timing values may be the lowest-magnitude ones of the at least two of the second timing values.

In one embodiment, the second percentage of fuel may be less than the first percentage of fuel, and the first direction may be less than the reference timing value. Alternatively, the second percentage of fuel may be greater than the first percentage of fuel, and the first direction may be greater than the reference timing value.

The control computer may further be configured to collect for each cylinder having a corresponding first timing value that deviates in a second direction, opposite the first direction, from the reference timing value a third timing value indicative of a contribution of that cylinder to rotational speed of the engine while controlling the fueling signals to supply a third percentage of fuel to that cylinder, and to identify that cylinder as firing normally if its corresponding third timing value deviates in the first direction from the reference timing value.

The control computer may further be configured to continually modify for each cylinder having a corresponding third timing value that deviates in the second direction from the reference timing value a current percentage of fuel supplied to that cylinder by a predefined modification percentage up to a fourth percentage of fuel, collect for that cylinder another timing value indicative of a contribution of that cylinder to rotational speed of the engine while controlling the fueling signals to supply the modified percentage of fuel to that cylinder, and to identify that cylinder as firing normally if its another timing value deviates in the first direction from the reference timing value and the modified percentage of fuel deviates in the first direction from a fourth percentage of fuel.

The control computer may further be configured to identify as misfiring any cylinder having its another timing value deviate in the second direction from the reference timing value when the modified percentage of fuel deviates in the second direction from the fourth percentage of fuel.

In one embodiment, the second percentage of fuel may be less than the first percentage of fuel, the third percentage of fuel may be greater than the first percentage of fuel and the fourth percentage of fuel may be greater than the third percentage of fuel, and the first direction may be less than the reference timing value and less than the fourth predetermined percentage of fuel, and the second direction may be greater than the reference timing value and greater than the fourth predetermined percentage of fuel. Alternatively, the second percentage of fuel may be greater than the first percentage of fuel, the third percentage of fuel may be less than the first percentage of fuel and the fourth percentage of fuel may be less than the third percentage of fuel, and the first direction may be greater than the reference timing value and greater than the fourth predetermined percentage of fuel, and the second direction may be less than the reference timing value and less than the fourth predetermined percentage of fuel.

The control computer may be configured to diagnose cylinder misfiring conditions in the engine only if and while a number of diagnostic enable conditions are satisfied. One of the number of diagnostic enable conditions may correspond to the rotational speed of the engine being within a predefined speed range. Alternatively or additionally, the of the number of diagnostic enable conditions may correspond to the engine load being below a maximum engine load value. Alternatively or additionally, one of the number of diagnostic enable conditions may correspond to the accelerator pedal position being in an engine idling position. Alternatively or additionally, one of the number of diagnostic enable conditions may correspond to a commanded engine speed being at a substantially constant idle reference speed value. Alternatively or additionally, one of the number of diagnostic enable conditions may correspond to the road speed being less than a predefined road speed value. Alternatively or additionally, one of the number of diagnostic enable conditions may correspond to the operating temperature of the engine being above a minimum engine operating temperature. Alternatively or additionally, one of the number of diagnostic enable conditions may correspond to the power-take-off device being inactive.

The system may further include a memory unit, and the control computer may be configured to store in the memory unit a pass flag for each cylinder identified as firing normally. The control computer may further be configured to store in the memory unit a fail flag for each cylinder identified as misfiring.

The control computer may be configured to reset the percentage of fuel supplied to the cylinders of the engine to default fueling percentage values after diagnosing cylinder misfiring conditions for all cylinders of the engine.

These and other features of the present invention will become more apparent from the following description of the illustrative embodiments.

DESCRIPTION OF THE ILLUSTRATIVE EMBODIMENTS

Figure 1:
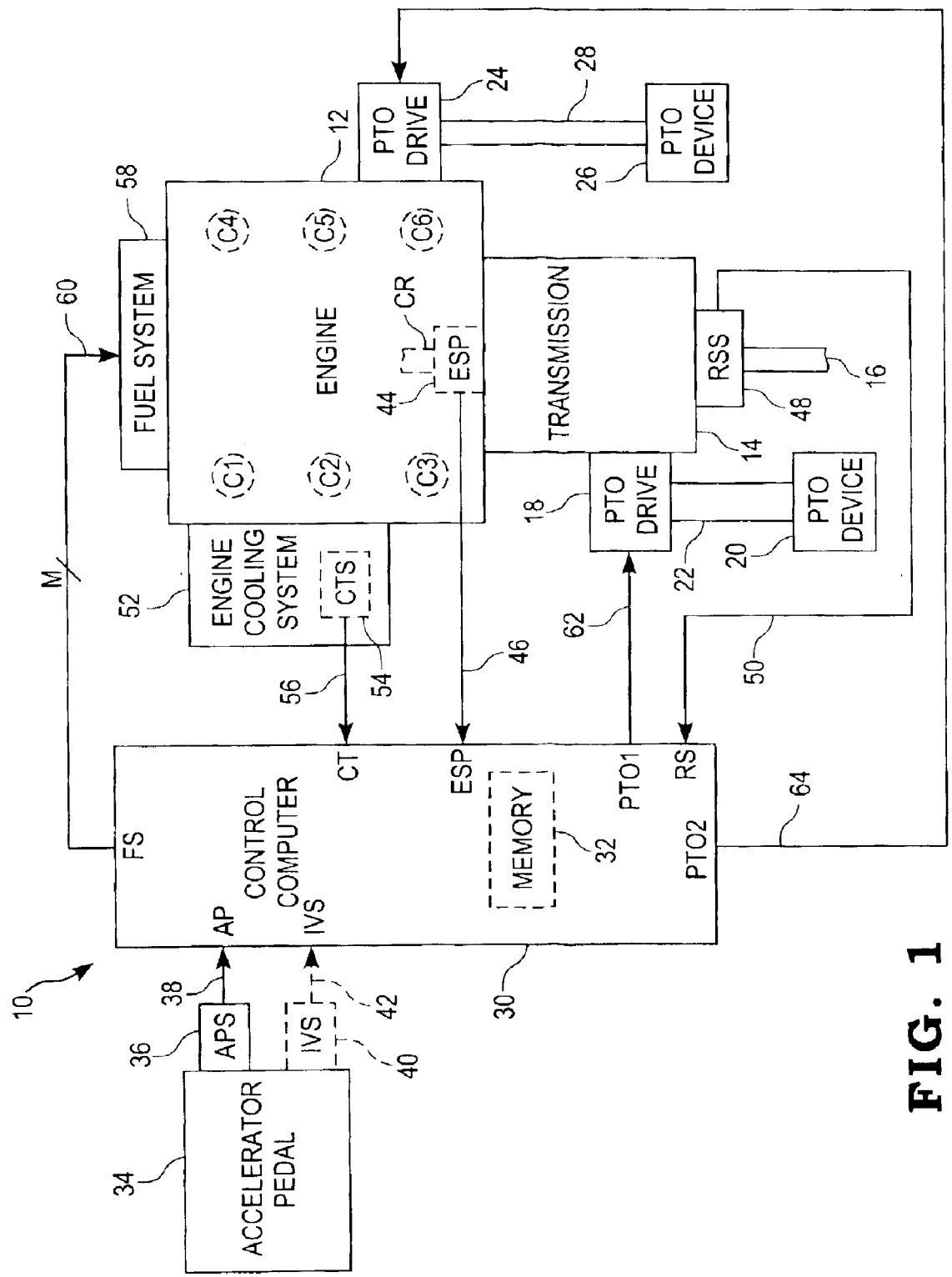
FIG. 1 is a diagram of one illustrative embodiment of a system for diagnosing cylinder misfiring conditions in an internal combustion engine.

For the purposes of promoting an understanding of the principles of the invention, reference will now be made to a number of illustrative embodiments shown in the drawings and specific language will be used to describe the same. It will nevertheless be understood that no limitation of the scope of the invention is thereby intended.

Referring now to FIG. 1, a diagram of one illustrative embodiment of a system 10 for diagnosing cylinder misfiring in an internal combustion engine is shown. System 10 includes an internal combustion engine 12 operatively coupled to a transmission 14 that is operatively coupled to a propeller shaft or drive shaft 16. The engine 12 may include any number, N, of cylinders, wherein N may be any positive integer. In the illustrated embodiment, for example, engine 12 includes six such cylinders C1–C6, although engine 12 may alternatively be configured with any number of cylinders. The transmission 14 may have a power-take-off (PTO) drive mechanism 18 operatively coupled thereto, wherein PTO drive mechanism 18 is operatively coupled to a drive shaft 22 configured for coupling to a PTO device 20. Alternatively or additionally, engine 12 may have another PTO drive mechanism 24 operatively coupled thereto, wherein PTO drive mechanism 24 is operatively coupled to a drive shaft 28 configured for coupling to a PTO device 26. PTO devices 20 or 26 may be any known machinery and/or mechanism configured to be driven by a conventional PTO drive mechanism.

System 10 includes a control computer 30 that is generally operable to control and manage the overall operation of engine 12. Control computer 30 includes a memory unit 32 as well as a number of inputs and outputs for interfacing with various sensors and systems coupled to engine 12. Control computer 30 is, in one embodiment, microprocessor-based and may be a known control unit sometimes referred to as an electronic or engine control module (ECM), electronic or engine control unit (ECU) or the like, or may alternatively be a general purpose control circuit capable of operation as will be described hereinafter. In any case, control computer 30 includes one or more control algorithms, as will be described in greater detail hereinafter, for diagnosing cylinder misfiring conditions.

Control computer 30 includes a number of inputs for receiving signals from various sensors or sensing systems associated with system 10. For example, system 10 includes an accelerator pedal 34 of known construction and having an accelerator pedal position sensor. 36 electrically connected to an accelerator pedal input, AP, of control computer 30 via signal path 38. Sensor 36 may be of known construction and is responsive to movement of the accelerator pedal 34 to produce an accelerator pedal signal on signal path 36 indicative of the position of the accelerator pedal 34 relative to a reference accelerator pedal position. Accelerator pedal 34 may optionally include an idle validation switch 40 electrically connected to an idle validation switch input, IVS, of control computer 30 via signal path 42 as shown in phantom in FIG. 1. If included, the idle validation switch 40 is suitably positioned relative to the accelerator pedal 34 such that switch 40 is in a first switch position; e.g., open, when the accelerator pedal 34 is not being depressed by the vehicle operator, and is in a second opposite position; e.g., closed, when the accelerator pedal is being depressed by the vehicle operator. The status of the idle validation switch signal produced by switch 40 thus provides an indication of whether pedal 34 is or is not being depressed, and therefore provides an indication of whether engine idle speed correspondingly is or is not being demanded by the vehicle operator. Control computer 30 is configured to determine whether engine idle speed is being demanded by the vehicle operator at any time by monitoring and processing the accelerator pedal signal produced on signal path 38 and/or by monitoring and processing the idle validation switch signal produced on signal path 42.

System 10 further includes an engine speed and position sensor 44 (ESP) electrically connected to an engine speed and position input, ESP, of control computer 30 via signal path 46. Engine speed and position sensor 44 is operable to sense rotational speed of the engine 12 and also the rotational position of the engine crankshaft, CR, hereinafter "crank angle", relative to a reference engine crankshaft position; e.g., top-dead-center, or TDC, and to produce an engine speed and position signal on signal path 46 indicative of engine rotational speed and crank angle in a known manner. In one embodiment, sensor 44 is a known Hall effect sensor operable to determine engine speed and crank angle by sensing passage thereby of a number of equiangularly spaced teeth formed on a gear or tone wheel rotating synchronously with the engine crank shaft, CR, wherein the gear or tone wheel also includes a reference tooth that establishes a reference crank shaft position; e.g., TDC. Alternatively, engine speed sensor 44 may be any other known sensor operable as just described including, but not limited to, a variable reluctance sensor or the like.

System 10 further includes a vehicle road speed sensor 48 electrically connected to a road speed input, RS, of control computer 30 via signal path 50. In the illustrated embodiment, the road speed sensor, 48, is disposed about, or adjacent to, the propeller shaft or tailshaft 16 extending from the transmission 14, although sensor 48 may alternatively be positioned relative to one or more other components rotating synchronously with the tailshaft 16 such as, for example, a drive axle or vehicle wheel. In any case, control computer 30 is configured to process the road speed signal produced by sensor 48 and determine therefrom the road speed of the vehicle carrying engine 12. In one embodiment, the road speed sensor 48 is a variable reluctance sensor, although other known vehicle road speed sensors may alternatively be used.

Engine 12 further includes a conventional engine cooling system 52. As is known in the art, cooling system 52 defines a fluid flow path through engine 12, and coolant fluid carried by the cooling system 52 circulates through the engine 12 and the cooling system 52 to cool the engine 12 during operation thereof. A coolant temperature sensor 54 is disposed in fluid communication with the coolant fluid carried by the engine cooling system 52, and is electrically connected to a coolant temperature input, CT, of control computer 30 via signal path 56. Coolant temperature sensor 54 may be of known construction, and is operable to produce a temperature signal on signal path 56 indicative of the temperature of the coolant fluid within the engine cooling system 52, and therefore of the operating temperature of the engine.

System 10 further includes a fuel system 58 electrically connected to a fuel signal output, FS, of control computer 30 via a number, M, of signal paths 60 wherein M may be any positive integer. Fuel system 58 is responsive to fuel signals produced by control computer 30 at output FS to deliver fuel to each of the cylinders, e.g., C1–C6, of engine 12 in a known manner.

Figure 2:
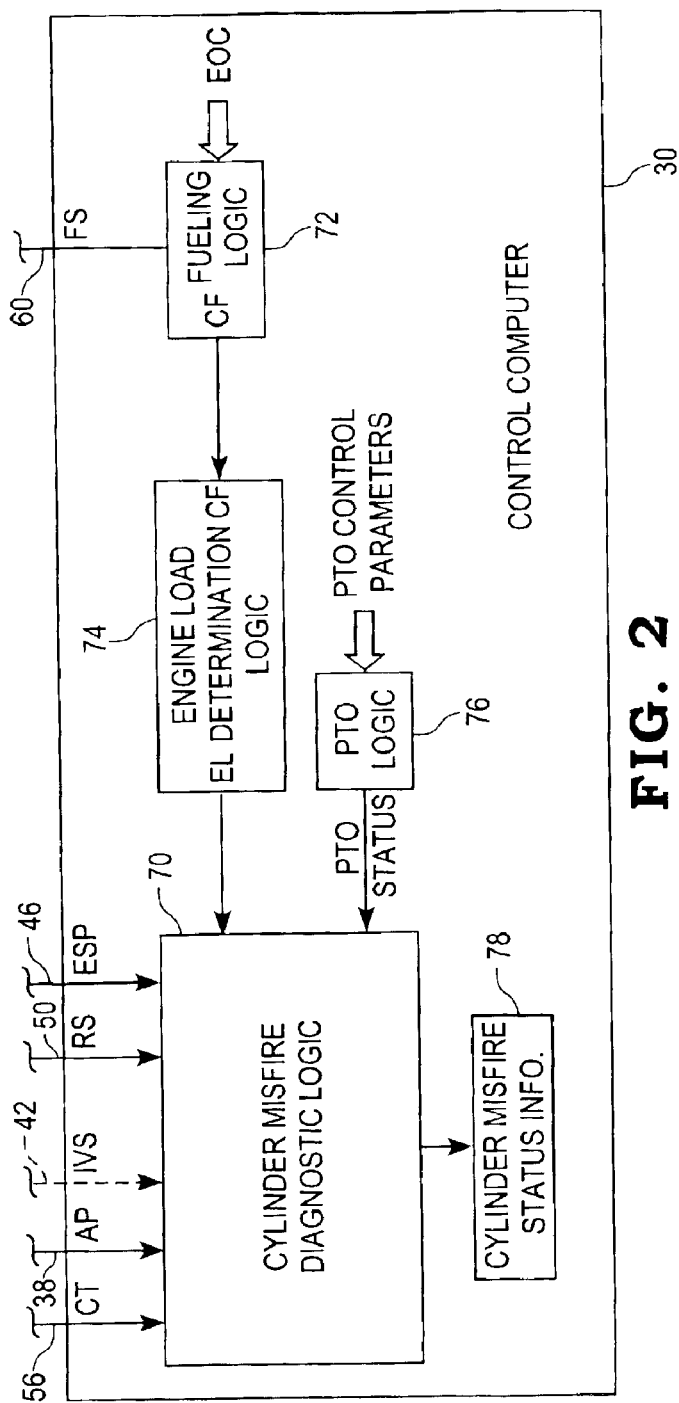
FIG. 2 is a block diagram of one illustrative configuration of some of the internal features of the control computer of FIG. 1 as they relate to diagnosing cylinder misfiring conditions.

Referring now to FIG. 2, a block diagram of one illustrative configuration of some of the internal features of control computer 30, as they relate to diagnosing cylinder misfiring conditions, is shown. Control computer 30 includes a cylinder misfire diagnostic block 70 receiving the coolant temperature signal on signal path 56, the accelerator pedal signal on signal path 38, the road speed signal on signal path 50, the engine speed signal on signal path 46, optionally the idle validation signal on signal path 42, an engine load value from an engine load determination logic block 74, and a PTO status value from a PTO logic block 76.

Control computer 30 further includes a fueling logic block 72 that is responsive in a conventional manner to a number of engine operating conditions, EOC, such as the engine speed signal on signal path 46, one or more torque request signals, and the like, to determine commanded fuel values, CF, and to then process such commanded fuel values to produce corresponding fuel signals at output FS on signal paths 78. The engine load determination block 74 is configured to receive the commanded fueling value, CF, from the fueling logic block 72, and to determine an engine load value, EL, as a function of the commanded fueling value, CF, in a conventional manner. In one embodiment, for example, block 74 is operable to compute the engine load value, EL, as a ratio of CF and the difference between a "full-load" fueling value and a "no-load" fueling value, wherein the "full-load" and "no-load" fueling values are typically calibratible values stored in memory 32. Those skilled in the art will recognize that block 74 may alternatively be configured to compute the engine load value, EL, according to other known functions of commanded fueling, CF, and/or other engine operating conditions, and any other such alternate configuration of block 74 is intended to fall within the scope of the claims appended hereto. In any case, the engine load value, EL, is generally a parameter that is indicative of the amount of work being done by the engine 12. The PTO logic block 76 is responsive to a number of PTO control parameters to determine in a known manner the operational status of any of the PTO devices 20, 26; i.e., whether any of the PTO devices 20, 26 are currently active or inactive.

The cylinder misfire diagnostic logic block 70 includes a control structure, which may be in the form of a software algorithm, for instructing the control computer 30 to process information provided information provided to the various inputs of block 70 to diagnose cylinder misfiring conditions, one embodiment of which will be described in greater detail hereinafter. The cylinder misfire diagnostic logic block is operable to produce as an output an indication of whether each cylinder of the engine 12 is firing normally or is instead misfiring, and computer 30 accordingly includes a memory block 78 configured to store such cylinder misfire status information.

Referring now to FIGS. 4A–4D, a flowchart is shown illustrating one embodiment of a software algorithm 100 for diagnosing cylinder misfiring in an internal combustion engine. Algorithm 100 may be stored in memory 32 generally (FIG. 1) and within the cylinder misfire diagnostic logic block 70 specifically, and is in any case is executed by control computer 30. Algorithm 100 begins at step 102. At step 104, control computer 30 is operable to determine a number of cylinder misfire diagnostic enable parameter values, and thereafter at step 106 control computer 30 is operable to determine whether all of a corresponding number of diagnostic enable conditions have been satisfied. In one embodiment, control computer 30 is operable to execute steps 104 and 106 by monitoring the engine and system sensor operating conditions set forth in the following Table 1, and comparing these various engine and system sensor operating conditions to their corresponding parameter thresholds, ranges or conditions also set forth in Table 1. If all of the diagnostic enabling conditions set forth in Table 1 are satisfied, algorithm execution advances from step 106 to step 108, and otherwise it loops back to step 104.

TABLE 1

| Engine Operating Parameter | Enabling Threshold, Range or Condition |
| --- | --- |
| Engine Rotational Speed (ES) | $ES_{MIN} < ES < ES_{MAX}$ |
| Engine Load (EL) | $EL < EL_{MAX}$ |
| Accelerator Pedal Position (AP) | AP = Idle position |
| Commanded Engine Speed (CES) | CES = Constant Idle Speed |
| Vehicle Road Speed (RS) | $RS < RS_{MAX}$ |
| Engine Operating Temperature (ET) | $FT > CT_{MIN}$ |
| Power Take Off Status | Inactive |

Most of the diagnostic enabling conditions set forth in Table 1 represent specified operating ranges of certain engine and/or system operating parameters. For example, the engine speed, ES, provided by the engine speed and position sensor 44, must be between minimum and maximum speed limits $ES_{MIN}$ and $ES_{MAX}$ respectively. The engine speed limit $ES_{MIN}$ is set at a minimum engine speed above which the engine is running smoothly and cylinder misfiring may be readily detected using the techniques described herein. The engine speed limit $ES_{MAX}$ is set at a maximum engine speed below which timing information provided by the engine speed and position sensor 44 may be easily processed to produce accurate and reliable timing information. While it will be understood that accurate timing information may generally be obtained from sensor 44 at engine speeds above $ES_{MAX}$, it is desirable to maintain engine speed below $ES_{MAX}$ to avoid corruption of the timing information due to excessive speeds beyond the optimal operating range of sensor 44 and/or to avoid the necessity of complicated filtering and/or other signal processing techniques to provide accurate and reliable timing information.

As another example, the engine load, EL, provided by the engine load determination block 74, must be below a maximum engine load value, $EL_{MAX}$. In one embodiment, $EL_{MAX}$ is set at a level below which the engine load is not working excessively hard so as to corrupt the timing information provided by the engine speed and position sensor 44. As yet another example, the accelerator pedal 34 must be at an engine idle position. In one embodiment, control computer 30 is operable to monitor the position of the accelerator pedal 34 via the accelerator pedal position sensor 36, and to process the accelerator pedal position signal produced by sensor 36 to determine, in a known manner, whether the accelerator pedal 34 is at an engine idle position. As is known in the art, control computer 30 may be configured to make such a determination by comparing the current position of the accelerator pedal 34 to a reference accelerator position. In some embodiments, the accelerator pedal 34 may include an idle validation switch 40 as show in phantom in FIG. 1 and described hereinabove. In such embodiments, control computer 30 may be alternatively or additionally configured to determine whether the accelerator pedal 34 is in an engine idle position simply by monitoring the status of the idle validation switch 40, wherein switch 40 is generally operable as described hereinabove.

As another example, the commanded engine speed, CES, must be a commanded engine idle speed and must not be changing; i.e., must be substantially constant. Those skilled in the art will recognize that the commanded engine speed, CES, generally refers to a reference engine speed determined by the control computer 30 in response to a number of current engine operating conditions including, for example, current accelerator pedal position or cruise control requested road speed, one or more reference engine speed limits or limiting control algorithms, and the like, and generally comprises a portion of the fueling logic block 72. In any case, the commanded engine speed, CES, as it relates to Table 1 must also be substantially constant. As still another example, the vehicle road speed, RS, provided by road speed sensor 48, must be below a maximum road speed value, $RS_{MAX}$. In one embodiment, $RS_{MAX}$ is a low value, e.g., 2 mph, although other values of $RS_{MAX}$ may be used. As a further example, the engine operating temperature, ET, must be greater than a minimum temperature value. It is desirable to set the minimum temperature value at a temperature level above which the engine is considered to be warmed up and operating at a normal operating temperature, although other minimum temperature values may be used. In one embodiment, the engine coolant temperature signal provided by coolant temperature sensor 54 is used as the indicator of engine operating temperature, and in this embodiment the engine operating temperature, ET, must be greater than a minimum engine coolant temperature, $CT_{MIN}$, as illustrated in Table 1. Those skilled in the art will recognize, however, that other known sensors or sensing systems for determining the engine operating temperature may be used in place of the temperature information provided by the coolant temperature sensor 54.

System 10 may further include conventional power take off (PTO) devices 20, 26 that may be driven by the engine 12 or transmission 14 as described hereinabove. In one embodiment, control computer 30 includes circuitry and/or software, e.g., PTO logic block 76, for controlling such PTO devices 20, 26, and in this embodiment block 76 provides PTO status information to the cylinder misfire diagnostic logic block 70 as illustrated in FIG. 2. The PTO status information includes information as to the operational status of one or more of the PTO devices 20, 26.

The diagnostic enabling conditions set forth in Table 1 are generally included to ensure that the engine is warm and running at a substantially constant engine idle speed to facilitate the accuracy of the cylinder misfire diagnostic algorithm. Those skilled in the art will recognize that Table 1 represents only one illustrative collection of cylinder misfire diagnostic enable conditions, and that this collection may alternatively exclude some of the listed conditions and/or include other engine and/or system operating condition that are not listed in Table 1. Any such alternate collection of enabling conditions will typically be dictated by the application and/or desired accuracy of the diagnostic algorithm, and is in any case intended to fall within the scope of the claims appended hereto.

Referring again to FIG. 4A, the execution of algorithm 100 advances from the YES branch of step 106 to step 108 where control computer 30 is operable to set a counter "i" to a predetermined one of the total number, N, of cylinders, wherein N may be any positive integer. In one embodiment, "i" is set to the first cylinder in the cylinder firing order, although "i" may alternatively be set to any desired cylinder number. Thereafter at step 110, control computer 30 is operable to command a first predetermined percentage of fuel to the ith cylinder. Control computer 30 is operable to execute step 110 via control of the fueling signal, FS, on an appropriate one of the "M" signal paths. In one embodiment, the first predetermined percentage of fuel is 100% fuel so that the control computer 30 is operable at step 110 to command 100% fueling to the ith cylinder. Alternatively, the first predetermined percentage of fuel may be more or less than 100% fueling, and any such alternate percentage is intended to fall within the scope of the claims appended hereto.

In some implementations of algorithm 100, the first predetermined percentage of fuel may correspond to the default fueling level, wherein the term "default fueling" is defined for purposes of this document as the fueling level or fuel percentage that would have been supplied to the engine generally or cylinder in question absent algorithm 100. In such cases, the following optional step 112 may be omitted. However, in cases where the first predetermined percentage of fuel differs from the default fueling level for the cylinder in question, optional step 112 may be included to provide a delay period to allow for the operation of the engine 12 to stabilize after changing the fueling percentage to the ith cylinder at step 110. In one embodiment, the delay period may be, for example, two engine cycles, although those skilled in the art will recognize that the duration of the delay period required at optional step 112 to allow stabilization of engine 12 following step 110 will generally depend upon the magnitude of the deviation between the first predetermined percentage of fuel and the default fueling level. In any case, algorithm execution advances from step 112 in embodiments including step 112, or from step 110 in embodiments wherein step 112 is-omitted, to step 114.

Figure 3:
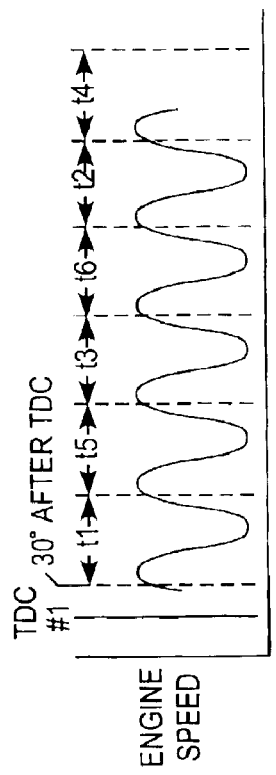
FIG. 3 is a plot of engine speed vs. time for an example six-cylinder engine illustrating firing times for each of the cylinders in firing order.
Figure 4A:
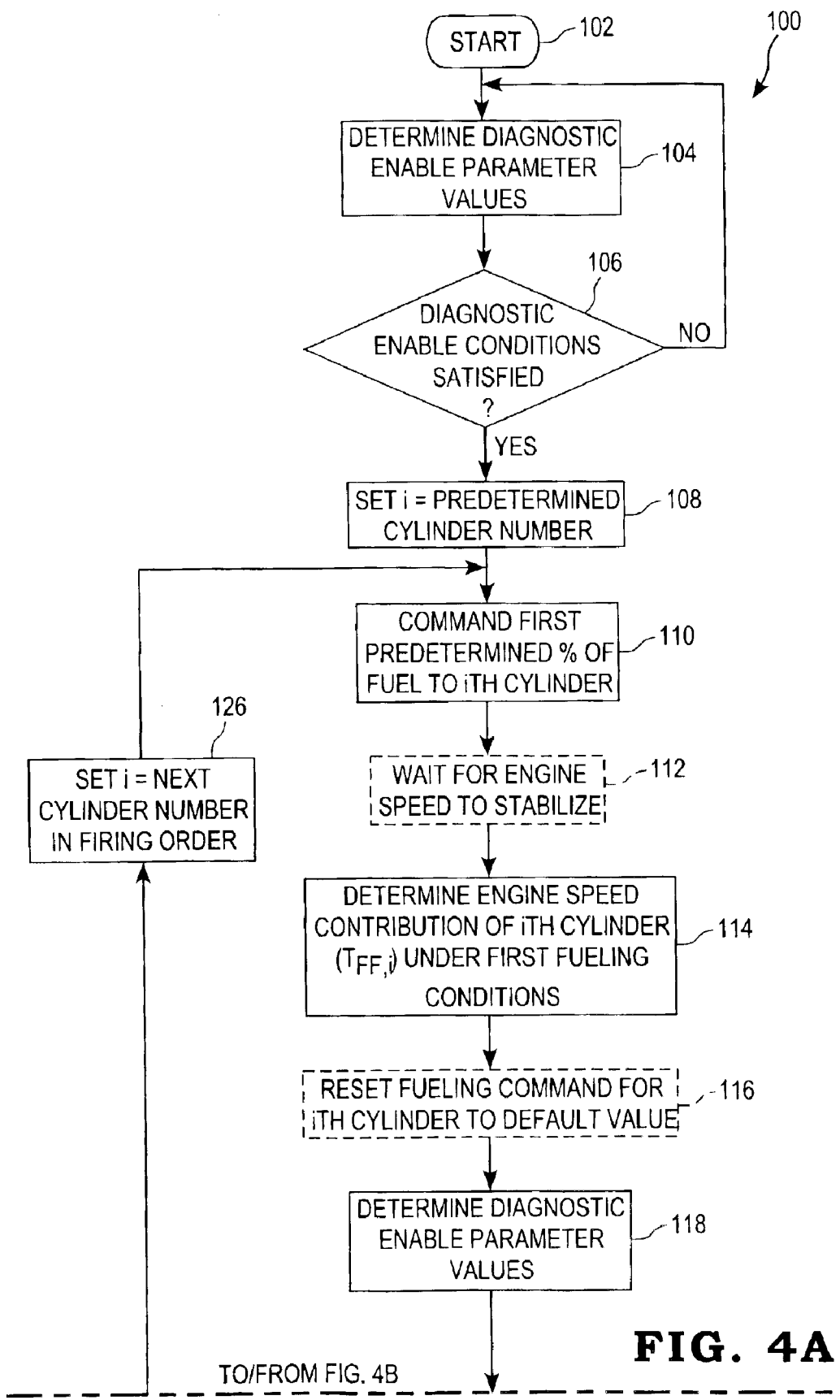
FIGS. 4A–4D represent a flowchart of one illustrative embodiment of a software algorithm for diagnosing cylinder misfire conditions.
Figure 4B:
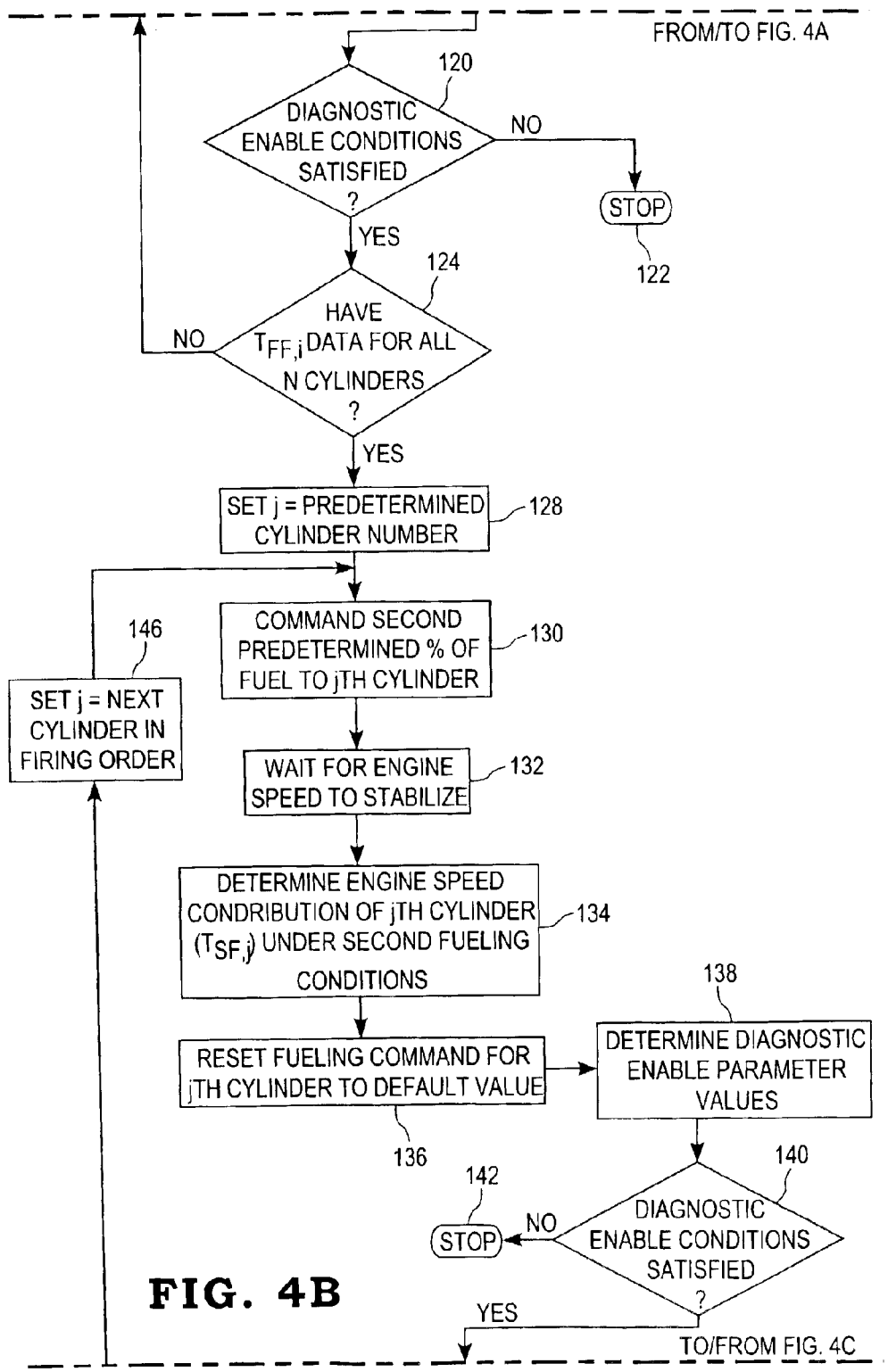
Figure 4C:
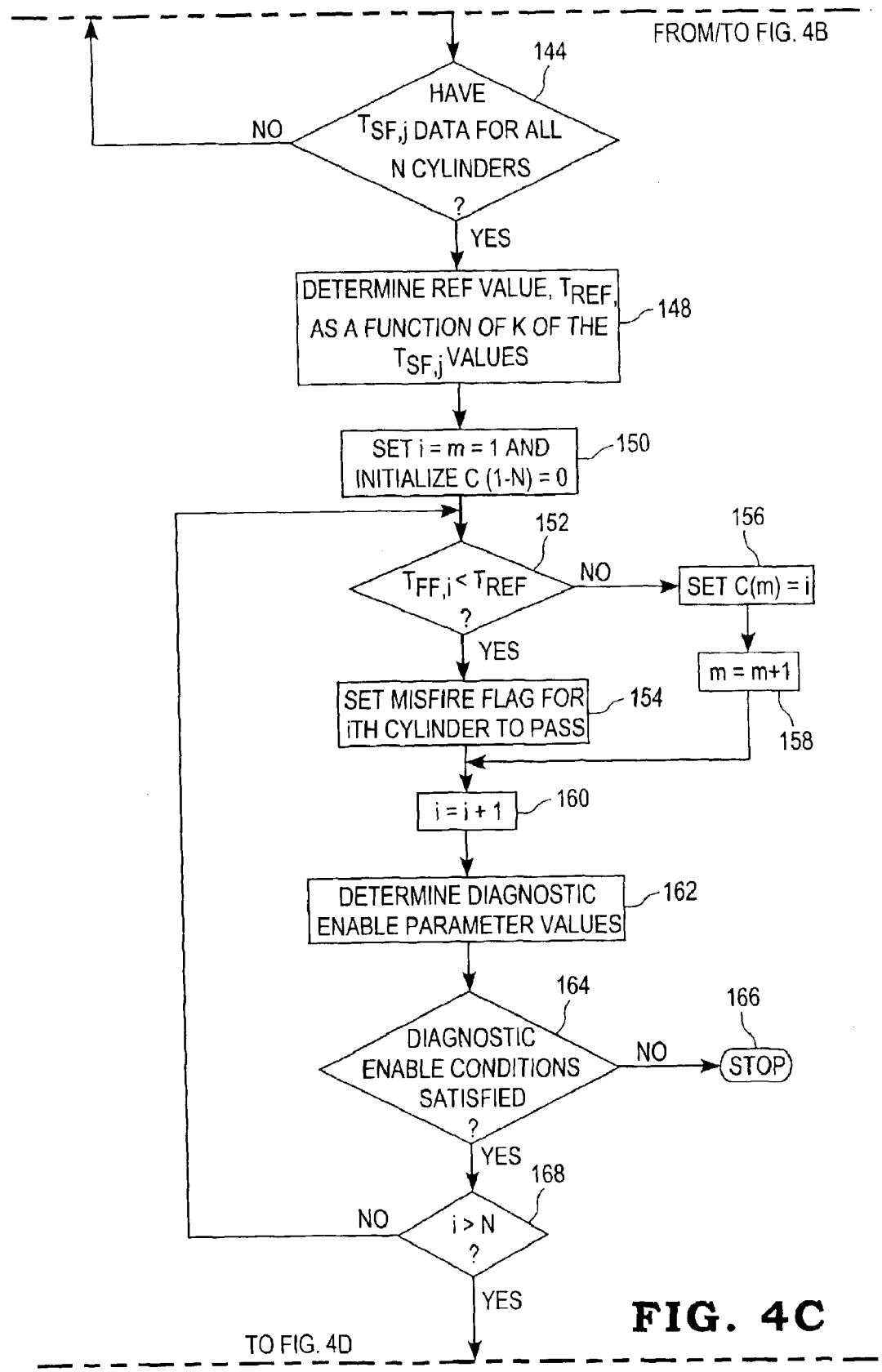
Figure 4D:
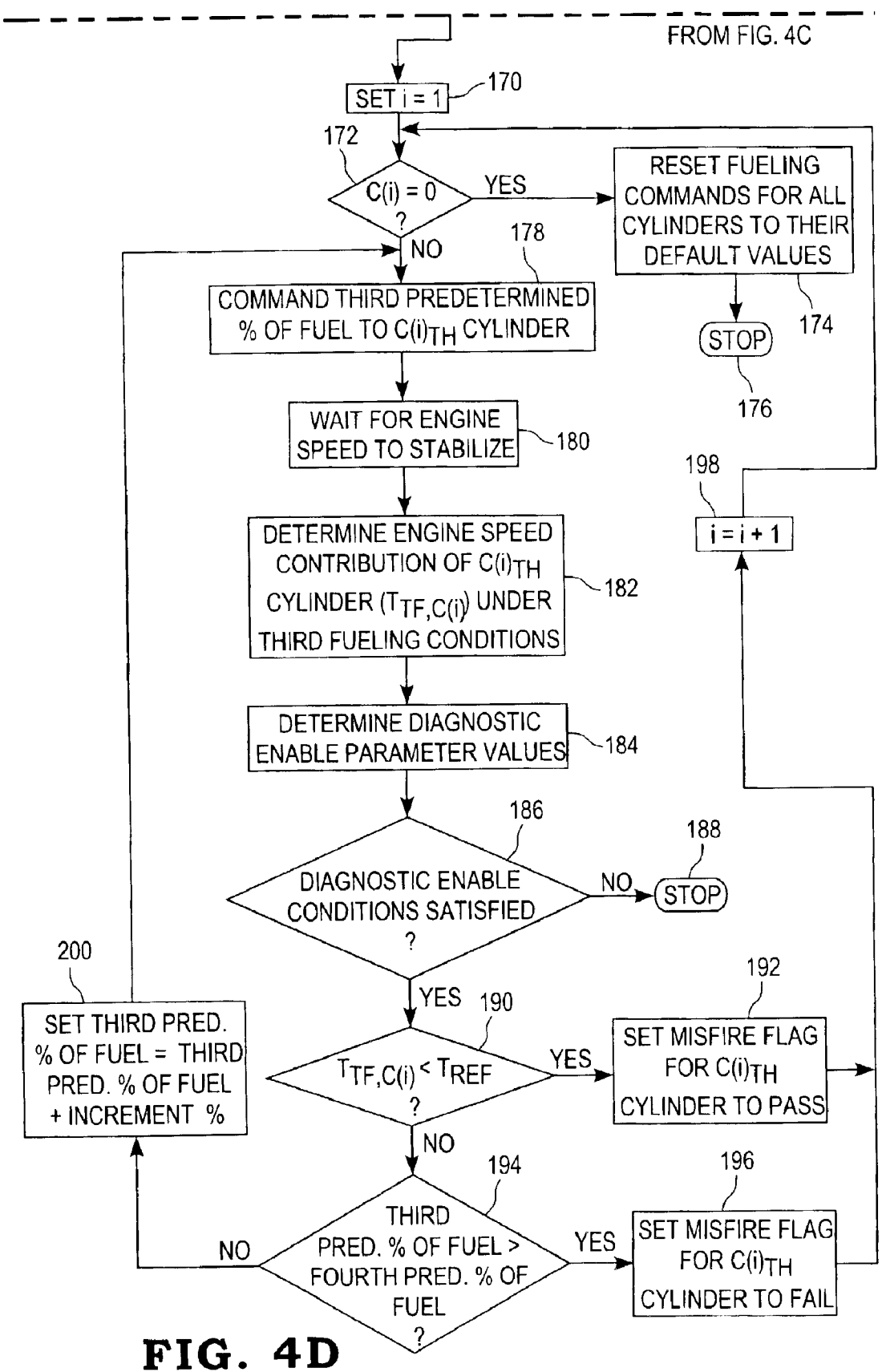

At step 114, control computer 30 is operable to determine a timing parameter, $T_{FF,i}$, corresponding to the contribution of the ith cylinder to the overall rotational speed of the engine 12. In relation to the system 10 illustrated in FIG. 1, control computer 30 is operable to execute step 114 by processing the engine position signal produced by the engine speed and position sensor 44 in a known manner to determine the timing parameter $T_{FF,i}$. In one embodiment of algorithm 100, the timing parameter, $T_{FF,i}$, is a measure of the elapsed time for the engine crankshaft, CR, to rotate through a predetermined crank angle. As an illustrative example of one specific embodiment, engine 12 may be a six-cylinder, four-stroke engine as illustrated by example in FIG. 1. The cylinders generally fire in a cylinder firing sequence as is known in the art, and one example of such a firing order for the six-cylinder engine 12 shown in FIG. 1 is illustrated in the engine speed vs. time plot of FIG. 3 as 1-5-3-6-2-4. In this example, the first cylinder begins firing at 30 degrees following TDC, and firing of the remaining cylinders follow in the illustrated sequence. One engine cycle; i.e., one traversal through the cylinder firing order, requires two revolutions of the engine crankshaft, CR, corresponding to a total of 720 degrees of crank angle. The maximum total crank angle representing each cylinder is thus 720/6=120 degrees of crank angle. In this specific embodiment, then, each timing parameter, $T_{FF,i}$, is a measure of the elapsed time for the crankshaft, CR, to travel 120 degrees relative to a predefined position; e.g., top-dead-center, TDC, 30 degrees following TDC, or other crankshaft reference position. In alternate embodiment of algorithm 100, the timing parameter, $T_{FF,i}$, is a measure of the change in time for the crankshaft, CR, to travel through a predetermined crank angle relative to the time of rotation of the crankshaft, CR, through the predetermined crank angle for the previous cylinder in the cylinder firing order. Those skilled in the art will recognize other known techniques for generating and/or determining the timing parameters, $T_{FF,i}$, as a measure of the contribution of each of the cylinders to the overall engine rotational speed, and any such other techniques are intended to fall within the scope of the claims appended hereto. As one illustrative example of such alternate techniques, the control computer 30 may be operable to collect timing parameter data, $T_{FF,i}$, over multiple engine cycles, and average and/or filter such data to thereby reduce noise effects resulting from operation of the engine speed and position sensor 44, from the engine combustion process and/or from other noise sources.

In some implementations of algorithm 100, as described hereinabove, the first predetermined percentage of fuel commanded at step 110 may correspond to the default fueling level. In such cases, the following optional step 116 may be omitted. However, in cases where the first predetermined percentage of fuel commanded at step 110 differs from the default fueling level for the cylinder in question, optional step 116 may be included wherein control computer 30 is operable to reset the fueling command to the ith cylinder to its default fueling value to thereby allow the operation of the ith cylinder to stabilize at its default fueling level before again altering fueling to this cylinder pursuant to algorithm 100 as will be described hereinafter. Those skilled in the art will recognize, however, that even in cases where the first predetermined percentage of fuel commanded at step 110 differs from the default fueling level for the cylinder in question, optional step 116 is not required and may therefore be omitted. In any case, algorithm execution advances from step 116 in embodiments including step 116, or from step 114 in embodiments wherein step 116 is omitted, to step 118.

At steps 118 and 120, control computer 30 is again operable to determine a number of diagnostic enable parameters and to determine therefrom whether a corresponding number of diagnostic enable conditions are satisfied. If control computer 30 determines at step 120 that one or more diagnostic enable conditions are not satisfied, algorithm execution advances to step 122 where execution of algorithm 100, and hence the cylinder misfire diagnostic monitor, is aborted. Steps 118 and 120 may be identical to steps 104 and 106 described hereinabove, and the diagnostic enable parameters and conditions may accordingly be the same as those illustrated in Table 1. Alternatively, steps 118 and 120 may be configured to direct control computer 30 to monitor a different set of cylinder misfire diagnostic enable conditions than those listed in Table 1, and this different set may exclude one or more of the listed conditions and/or include one or more other engine and/or system operating conditions that are not listed in Table 1. In any case, algorithm execution advances from the YES branch of step 120 to step 124 where control computer 30 is operable to determine whether the first timing values, $T_{FF,i}$, have been collected for each of the N cylinders. If not, algorithm execution advances to step 126 where control computer 30 is operable to set the counter "i" equal to the number of the next cylinder in the firing order, or alternatively to the number of any cylinder for which control computer 30 does not yet have $T_{FF,i}$ data, before looping back to step 110.

If, at step 124, control computer 30 determines that $T_{FF,i}$ data for all N cylinders has been collected, algorithm execution advances to step 128 where control computer 30 is operable to set a counter, "j" equal to a predetermined cylinder number; e.g., the number of the first cylinder in the cylinder firing order or other desired cylinder number. Thereafter at step 130, control computer 30 is operable to command a second predetermined percentage of fuel to the jth cylinder. Control computer 30 is operable to execute step 130 via control of the fueling signal, FS, on an appropriate one of the "M" signal paths. In one illustrative embodiment, the second predetermined percentage of fuel is less than the first predetermined percentage of fuel, and as one specific example of this embodiment the second predetermined percentage of fuel may be about 80% so that the control computer 30 is operable at step 130 in this example to command 80% fueling to the jth cylinder. Alternatively, the second predetermined percentage of fuel in this embodiment may be more or less than 80% fueling, and any such alternate percentage is intended to fall within the scope of the claims appended hereto.

Following step 130, control computer 30 is operable at step 132 to wait for a delay period to allow for the operation of the engine 12 to stabilize after changing the fueling percentage to the jth cylinder at step 130. In one embodiment, the delay period may be, for example, two engine cycles, although those skilled in the art will recognize that the duration of the delay period required at step 132 to allow stabilization of engine 12 following step 130 will generally depend upon the magnitude of the deviation between the first predetermined percentage of fuel and the second predetermined percentage of fuel. In any case, algorithm execution advances from step 132 to step 134 where control computer 30 is operable to determine a timing parameter, $T_{SF,j}$, corresponding to the contribution of the jth cylinder to the overall rotational speed of the engine 12. Control computer 30 may be operable at step 134 to determine $T_{SF,j}$ using any of a number of techniques, such as any one or more of those described hereinabove with respect to the determination of $T_{FF,i}$ values at step 110. In any case, however, control computer 30 is operable at step 134 to determine $T_{SF,j}$ in the same manner as used in determining the $T_{FF,i}$ values so that the $T_{SF,j}$ and $T_{FF,i}$ values represent consistent timing parameters.

Following step 134, control computer 30 is operable at step 136 to reset the fueling command to the jth cylinder to its default fueling value to thereby allow the operation of the jth cylinder to stabilize at its default fueling level before again altering fueling to this cylinder pursuant to algorithm 100 as will be described hereinafter. Thereafter at steps 138 and 140, control computer 30 is again operable to determine a number of diagnostic enable parameters and to determine therefrom whether a corresponding number of diagnostic enable conditions are satisfied. If control computer 30 determines at step 140 that one or more diagnostic enable conditions are not satisfied, algorithm execution advances to step 142 where execution of algorithm 100, and hence the cylinder misfire diagnostic monitor, is aborted. Steps 138 and 140 may be identical to steps 104 and 106 (and steps 118 and 120) described hereinabove, and the diagnostic enable parameters and conditions may accordingly be the same as those illustrated in Table 1. Alternatively, steps 138 and 140 may be configured to direct control computer 30 to monitor a different set of cylinder misfire diagnostic enable conditions than those listed in Table 1, and this different set may exclude one or more of the listed conditions and/or include one or more other engine and/or system operating conditions that are not listed in Table 1. In any case, algorithm execution advances from the YES branch of step 140 to step 144 where control computer 30 is operable to determine whether $T_{SF,j}$ data has been collected for each of the N cylinders. If not, algorithm execution advances to step 146 where control computer 30 is operable to set the counter "j" equal to the number of the next cylinder in the firing order, or alternatively to the number of any cylinder for which control computer 30 does not yet have $T_{SF,j}$ data, before looping back to step 130.

If, at step 144, control computer 30 determines that $T_{SF,j}$ data for all N cylinders has been collected, algorithm execution advances to step 148 where control computer 30 is operable to determine a reference timing value, $T_{REF}$, generally as a function of a number, K, of the second timing values, $T_{SF,j}$, wherein K may be any positive integer less than or equal to the number of cylinders, N. In one illustrative embodiment, control computer is operable at step 148 to compute the reference timing value, $T_{REF}$, as an average, or predetermined percentage of the average, of two or more of the second timing values, $T_{SF,j}$, and as one specific example of this embodiment, control computer 30 may be operable at step 148 to compute the reference timing value, $T_{REF}$, as an algebraic average, or predetermined percentage of the algebraic average, of the three lowest-magnitude $T_{SF,j}$ values. In any case, the predetermined percentage of the average may be any desired percentage value. It will be understood, however, that control computer 30 may alternatively be operable at step 148 to compute the reference timing value, $T_{REF}$, according to one or more other known functions of one or more of the $T_{SF,j}$ values including, for example, but not limited to, the value of any desired one of the $T_{SF,j}$ values, an average, using any known averaging technique, of any desired two or more of the $T_{SF,j}$ values, a mean or median, or desired percentage of a mean or median, of any one or combination of the $T_{SF,j}$ values, a minimum of any desired one or combination of the $T_{SF,j}$ values, a maximum of any desired one or combination of the $T_{SF,j}$ values, or the like, and any such alternate computation of the reference timing value, $T_{REF}$, is intended to fall within the scope of the claims appended hereto.

Following step 148, control computer 30 is operable at step 150 to set counters "i" and "m" equal to one, and to initialize the value of each location of an "N" dimensional count array, "C" to zero. Thereafter at step 152, control computer 30 is operable to compare the ith one of the first timing values, $T_{FF,i}$, to the reference timing value, $T_{REF}$, determined at step 148. In one embodiment, as described hereinabove, the second predetermined fuel percentage commanded at step 130 is generally less than the first predetermined fuel percentage commanded at step 110, and the reference timing value, $T_{REF}$, is a predetermined percentage of an average of two or more of the second timing value, $T_{SF,j}$. In this embodiment, the reference timing value, $T_{REF}$, would generally be expected to greater than each of the first timing values, $T_{FF,i}$, in a normally firing engine since the lower fueling values used to generate $T_{REF}$ would cause the engine crankshaft, CR, to rotate at a slower speed than it would at the higher fueling values used to generate the first timing values, $T_{FF,i}$. Consequently, the elapsed times, $T_{FF,i}$, for the crankshaft, CR, to rotate through each of the predetermined crank angles under the first fueling percentage commands would be expected to be less than $T_{REF}$. In this embodiment, control computer 30 is accordingly operable at step 152 whether $T_{FF,i}$ is less than $T_{REF}$. If so, algorithm execution advances to step 154 where control computer 30 is operable to identify the ith cylinder as firing normally. In one embodiment, control computer 30 is operable at step 154 to identify the ith cylinder as firing normally by setting a misfire flag for the ith cylinder in the cylinder misfire status information block 78 to PASS. Alternatively or additionally, control computer 30 may be operable at step 154 to identify the ith cylinder as firing normally according to other known notification techniques including for example, but not limited to, providing such information to a visual display unit (not shown), by transmitting such information to one or more systems link in communication with control computer 30, by logging performance information; e.g., cylinder timing information, or the like.

If, at step 152, control computer 30 determines that the ith one of the first timing values, $T_{FF,i}$, is greater than or equal to the reference timing value, $T_{REF}$, algorithm execution advances to step 156 where the ith cylinder is marked for further misfire diagnosis by storing the value of "i" in the mth location of the count array; e.g., by setting C(m)=i. Thereafter at step 158, control computer 30 is operable to increment the counter "m" by one. From steps 154 and 158, algorithm execution advances to step 160 where control computer 30 is operable to increment the counter "i" by one. Thereafter at steps 162 and 164, control computer 30 is again operable to determine a number of diagnostic enable parameters and to determine therefrom whether a corresponding number of diagnostic enable conditions are satisfied. If control computer 30 determines at step 164 that one or more diagnostic enable conditions are not satisfied, algorithm execution advances to step 166 where execution of algorithm 100, and hence the cylinder misfire diagnostic monitor, is aborted. Steps 162 and 164 may be identical to steps 104 and 106 (and also steps to 118–120 and steps 138–140) described hereinabove, and the diagnostic enable parameters and conditions may accordingly be the same as those illustrated in Table 1. Alternatively, steps 162 and 164 may be configured to direct control computer 30 to monitor a different set of cylinder misfire diagnostic enable conditions than those listed in Table 1, and this different set may exclude one or more of the listed conditions and/or include one or more other engine and/or system operating conditions that are not listed in Table 1. In any case, algorithm execution advances from the YES branch of step 164 to step 168 where control computer 30 is operable to determine whether the counter "i" is greater than the total number of cylinders, N. If not, algorithm execution loops back to step 152. If, on the other hand, control computer 30 determines at step 168 that the counter "i" is greater than N, then each of the N cylinders has either been identified as firing normally or has been marked for further misfire diagnosis, and algorithm execution advances to step 170.

At step 170, control computer 30 is operable to set the counter "i" equal to one. Thereafter at step 172, control computer 30 is operable to determine whether the value stored in the ith location of the count array is zero; e.g., whether C(i)=0. If so, this means that all of the first timing values, $T_{FF,i}$, were found at step 152 to be less than the reference timing value, $T_{REF}$, and that no cylinders have thus been marked at step 156 for further misfiring diagnosis. In this case, the cylinder misfire diagnostic algorithm is complete, and algorithm execution advances to step 174 where control computer 30 is operable to reset the fueling commands for all of the cylinders to their corresponding default fueling values and thereafter to step 176 where algorithm 100 is terminated. If, on the other hand, control computer 30 determines at step 172 that the value stored in ith location of the count array is not zero, this indicates that one or more cylinders have been marked for further misfire diagnosis and algorithm execution advances to step 178 where control computer 30 is operable to command a third predetermined percentage of fuel to the $C(i)_{TH}$ cylinder. Control computer 30 is operable to execute step 178 via control of the fueling signal, FS, on an appropriate one of the "M" signal paths. In one illustrative embodiment, the third predetermined percentage of fuel is greater than the first predetermined percentage of fuel, and as one specific example of this embodiment the third predetermined percentage of fuel may be about 120% so that the control computer 30 is operable at step 178 in this example to command 120% fueling to the $C(i)_{TH}$ cylinder. Alternatively, the third predetermined percentage of fuel in this embodiment may be more or less than 120% fueling, and any such alternate percentage is intended to fall within the scope of the claims appended hereto.

Following step 178, control computer 30 is operable at step 180 to wait for a is delay period to allow for the operation of the engine 12 to stabilize after changing the fueling percentage to the $C(i)_{TH}$ cylinder at step 178. In one embodiment, the delay period may be, for example, two engine cycles, although those skilled in the art will recognize that the duration of the delay period required at step 180 to allow stabilization of engine 12 following step 178 will generally depend upon the magnitude of the deviation between the previous fuel level commanded to the $C(i)_{TH}$ cylinder and the third predetermined percentage of fuel. In any case, algorithm execution advances from step 180 to step 182 where control computer 30 is operable to determine a timing parameter, $T_{TF,C(i)}$, corresponding to the contribution of the $C(i)_{TH}$ cylinder to the overall rotational speed of the engine 12. Control computer 30 may be operable at step 182 to determine $T_{TF,C(i)}$ using any one or more of a number of techniques as described hereinabove with respect to the determination of $T_{FF,i}$ at step 110. In any case, however, control computer 30 is operable at step 182 to determine $T_{TF,C(i)}$ in the same manner as used in determining the $T_{FF,i}$ and $T_{SF,j}$ values so that the $T_{TF,C(i)}$, $T_{SF,j}$ and $T_{FF,i}$ values each represent consistent timing parameters.

Following step 182, control computer 30 is operable at steps 184 and 186 to determine a number of diagnostic enable parameters and to determine therefrom whether a corresponding number of diagnostic enable conditions are satisfied. If control computer 30 determines at step 186 that one or more diagnostic enable conditions are not satisfied, algorithm execution advances to step 188 where execution of algorithm 100, and hence the cylinder misfire diagnostic monitor, is aborted. Steps 184 and 186 may be identical to steps 104 and 106 (as well as steps 118–120, steps 138–140 and steps 162–164) described hereinabove, and the diagnostic enable parameters and conditions may accordingly be the same as those illustrated in Table 1. Alternatively, steps 184 and 186 may be configured to direct control computer 30 to monitor a different set of cylinder misfire diagnostic enable conditions than those listed in Table 1, and this different set may exclude one or more of the listed conditions and/or include one or more other engine and/or system operating conditions that are not listed in Table 1.

In any case, algorithm execution advances from the YES branch of step 186 to step 190 where control computer 30 is operable to compare the $C(i)_{TH}$ one of the third timing values, $T_{TF,C(i)}$, to the reference timing value, $T_{REF}$, determined at step 148. In one embodiment, as described hereinabove, the third predetermined fuel percentage commanded at step 178 is generally greater than the first predetermined fuel percentage commanded at step 110, and the reference timing value, $T_{REF}$, is a predetermined percentage of an average of two or more of the second timing value, $T_{SF,j}$. In this embodiment, if the cylinder in question is not completely misfiring, it would be expected that by sufficiently increasing the fueling percentage to the $C(i)_{TH}$ cylinder, the third timing value, $T_{TF,C(i)}$, should be less than the reference timing value, $T_{REF}$. In this embodiment, control computer 30 is accordingly operable at step 190 to determine whether $T_{TF,C(i)}$ is less than $T_{REF}$. If so, algorithm execution advances to step 192 where control computer 30 is operable to identify the $C(i)_{TH}$ cylinder as firing normally. In one embodiment, control computer 30 is operable at step 192 to identify the $C(i)_{TH}$ cylinder as firing normally by setting a misfire flag for the $C(i)_{TH}$ cylinder in the cylinder misfire status information block 78 to PASS. Alternatively or additionally, control computer 30 may be operable at step 192 to identify the $C(i)_{TH}$ cylinder as firing normally according to other known notification techniques including for example, but not limited to, providing such information to a visual display unit (not shown), by transmitting such information to one or more systems link in communication with control computer 30, by logging performance information; e.g., cylinder timing information, or the like.

If, at step 190, control computer 30 determines that the $C(i)_{TH}$ one of the third timing values, $T_{TF,C(i)}$, is greater than or equal to the reference timing value, $T_{REF}$, algorithm execution advances to step 194 where the third predetermined percentage of fuel is compared with a fourth predetermined percentage of fuel. In embodiments wherein the third predetermined percentage of fuel is generally greater than the first predetermined percentage of fuel as described hereinabove, the fourth predetermined percentage of fuel represents a maximum fuel percentage that may be commanded to the $C(i)_{TH}$ cylinder before identifying the $C(i)_{TH}$ cylinder as a misfiring cylinder. As a numerical example, in the case where the third predetermined percentage of fuel is about 120%, the fourth predetermined percentage of fuel may be about 200%. Alternatively, the fourth predetermined percentage of fuel may be less than or greater than 200%, wherein any such alternative percentage is intended to fall within the scope of the claims appended hereto. In any case, if control computer 30 thus determines at step 194 that the third predetermined percentage of fuel is greater than the fourth predetermined percentage of fuel, algorithm execution advances to step 196 where control computer 30 is operable to identify the $C(i)_{TH}$ cylinder as misfiring. In one embodiment, control computer 30 is operable at step 196 to identify the $C(i)_{TH}$ cylinder as misfiring by setting a misfire flag for the $C(i)_{TH}$ cylinder in the cylinder misfire status information block 78 to FAIL. Alternatively or additionally, control computer 30 may be operable at step 196 to identify the $C(i)_{TH}$ cylinder as misfiring according to other known notification techniques including for example, but not limited to, providing such information to a visual display unit (not shown), by transmitting such information to one or more systems link in communication with control computer 30, by logging performance information; e.g., cylinder timing information, or the like. From each of steps 192 and 196, algorithm execution advances to step 198 where the counter "i" is incremented by one, and algorithm executed loops therefrom back to step 172.

If control computer 30 determines at step 194 that the third predetermined percentage of fuel is less than the fourth predetermined percentage of fuel, algorithm execution advances to step 200 where control computer 30 is operable to increment the third predetermined percentage of fuel by a predetermined increment percentage. In one example embodiment, the increment percentage may be 20%, although the increment percentage may alternatively be any positive percentage value. From step 200, algorithm execution loops back to step 178.

It should be apparent from steps 172–200 that for each cylinder marked for further misfiring diagnosis, the fuel percentage to each cylinder is incrementally modified, up to a maximum (fourth predetermined) fuel percentage, and the cylinder timing information after each incremental fuel percentage modification is compared to the reference timing information. If the cylinder timing information is less than $T_{REF}$ before the incrementally modified fuel percentage reaches the maximum fuel percentage, the cylinder is identified as a normally firing cylinder. If, on the other hand, the cylinder timing information is still in excess of $T_{REF}$ when the modified fuel percentage reaches or exceeds the maximum fuel percentage, the cylinder is identified as a misfiring cylinder.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, in one illustrative embodiment of algorithm 100 described hereinabove, the second predetermined percentage of fuel was disclosed as generally being less than the first predetermined percentage of fuel, the third and fourth predetermined percentages of fuel were disclosed as generally being greater than the first predetermined percentage of fuel, and each cylinder was identified as firing normally if either its first timing value, $T_{FF,i}$, was found to be less than the reference timing value, $T_{REF}$, or its third timing value, $T_{TF,C(i)}$, was found to be less than $T_{REF}$ before the third predetermined fuel percentage reached the maximum fourth predetermined fuel percentage. Alternatively, algorithm 100 could be modified at step 130 such that the second predetermined percentage of fuel is generally greater than the first predetermined percentage of fuel. In this case, step 152 will also be modified such that the cylinder in question is identified as firing normally if its first timing value, $T_{FF,i}$, was greater than the reference timing value $T_{REF}$. Similarly, steps 178, 194 and 200 could be modified in this alternative embodiment such that the third predetermined percentage of fuel is generally less than the second predetermined percentage of fuel, the fourth predetermined percentage of fuel is less than the third predetermined percentage of fuel and therefore represents a minimum fueling level, and the third predetermined percentage of fuel is decremented by a predetermined decrement percentage at step 200. In this case, step 190 will also be modified such that the cylinder in question is identified as firing normally if its third timing value, $T_{TF,C(i)}$, is greater than the reference timing value, $T_{REF}$, and is identified as misfiring normally if $T_{TF,C(i)}$ is still less than or equal to the reference timing value, $T_{REF}$, when the third predetermined percentage of fuel drops below the fourth predetermined percentage of fuel. Such modifications to algorithm 100 would be a mechanical step for skilled programmer, and are intended to fall within the scope of the claims appended hereto. In either of these embodiments, the commanded percentage of fuel to each cylinder is selectively modified, corresponding cylinder timing information is obtained, and each cylinder is identified as firing normally if its corresponding cylinder timing information deviates from the reference timing value in a first direction, and is identified as misfiring if its corresponding cylinder timing information deviates from the reference timing value in a second opposite direction after the fueling command to that cylinder has been incrementally or decrementally modified through a desired fuel percentage range.

What is claimed is:

1. System for diagnosing cylinder misfiring in an internal combustion engine, comprising:

an engine position sensor producing a position signal indicative of an engine crankshaft position relative to a reference position;

means responsive to the position signal for determining a number of timing parameters each indicative of a contribution of a corresponding one of the engine cylinders to an overall rotational speed of the engine;

means for collecting first values of the number of timing parameters while a first percentage of fuel relative to 100% fueling is being supplied to each of the cylinders;

means for collecting second values of the number of timing parameters while a second percentage of fuel relative to 100% fueling is being supplied to each of the cylinders;

means for determining a reference timing value as a function of one or more of the second values of the number of timing parameters; and means for identifying as firing normally any cylinder having a corresponding first value of the number of timing parameters that deviates in a first direction from the reference timing value.

2. The system of claim 1 further including means for diagnosing cylinders having a corresponding first value of the number of timing parameters that deviates in a second direction from the reference timing value opposite the first direction, the means for diagnosing including:

means for collecting third values of the number of timing parameters while a third percentage of fuel relative to 100% fueling greater than the first percentage of fuel is being supplied to the cylinders having a corresponding first value of the number of timing parameters that deviates in the second direction from the reference timing value; and means for identifying as firing normally any cylinder having a corresponding third value of the number of timing parameters that deviates in the first direction from the reference timing value.

3. The system of claim 2 wherein the means for diagnosing further includes means for continually incrementally modifying the third percentage of fuel, collecting additional values of the number of timing parameters while the modified third percentage of fuel is being supplied to the cylinders having a corresponding first value of the number of timing parameters that deviates in the second direction from the reference timing value, and identifying as firing normally any cylinder having a corresponding additional value of the number of timing parameters that deviates in the first direction from the reference timing value while the incremented third percentage of fuel deviates in the first direction from a fourth percentage of fuel relative to 100% fueling.

4. The system of claim 3 wherein the means for continually incrementally modifying the third percentage of fuel further includes means for identifying as misfiring any cylinder having a corresponding additional value of the number of timing parameters that deviates in the second direction from the reference timing value when the incremented third percentage of fuel deviates in the second direction from the fourth percentage of fuel.

5. The system of claim 1 further including means for diagnosing cylinder misfiring conditions in the engine only while a number of diagnostic enable conditions are satisfied.

6. The system of claim 1 further including means for resetting the percentage of fuel supplied to the cylinders of the engine to default fueling percentage values after diagnosing cylinder misfiring conditions for all cylinders of the engine.

7. The system of claim 1 wherein the means for determining a reference timing value as a function of one or more of the second values of the number of timing parameters includes means for determining the reference timing value as one of an average of, and a predetermined percentage of the average of, at least two of the lowest-magnitude second values of the number of timing parameters.

8. The system of claim 1 further including means for storing in memory a pass flag for each cylinder identified as firing normally.

9. The system of claim 4 further including means for storing in memory a fail flag for each cylinder identified as misfiring.

10. System for diagnosing cylinder misfiring in an internal combustion engine, comprising:
    an engine position sensor producing a position signal indicative of an engine crankshaft position relative to a reference position;
    a fuel system responsive to fueling signals to supply fuel to each cylinder of the engine; and
    a control computer configured to process the position signal to determine a number of first timing values each indicative of a contribution of a corresponding one of the cylinders to rotational speed of the engine while controlling the fueling signals to supply a first percentage of fuel relative to 100% fueling to each of the cylinders, to process the position signal to determine a number of second timing values each indicative of a contribution of a corresponding one of the cylinders to rotational speed of the engine while controlling the fueling signals to supply a second percentage of fuel relative to 100% fueling to each of the cylinders, to determine a reference timing value as a function of one or more of the number of second timing values, and to identify as firing normally any cylinder having a corresponding first timing value that deviates in a first direction the reference timing value.

11. The system of claim 10 wherein the control computer is configured to process the position signal to determine the first and second timing values for each cylinder as an elapsed time for the engine crankshaft to rotate through a predetermined crank angle.

12. The system of claim 10 wherein the control computer is configured to process the position signal to determine the first and second timing values for each cylinder as an elapsed time for the engine crankshaft to rotate through a predetermined crank angle relative to rotation time through the predetermined crank angle for a previous cylinder in a cylinder firing order.

13. The system of claim 10 wherein the control computer is configured to determine the reference timing value as one of an average of, and a predetermined percentage of the average of, at least two of the second timing values.

14. The system of claim 13 wherein the control computer is configured to determine the reference timing value as one of an average of, and a predetermined percentage of the average of, at least two of the lowest-magnitude second timing values.

15. The system of claim 10 wherein the control computer is further configured to collect for each cylinder having a corresponding first timing value that deviates in a second direction, opposite the first direction, from the reference timing value a third timing value indicative of a contribution of that cylinder to rotational speed of the engine while controlling the fueling signals to supply a third percentage of fuel relative to 100% fueling to that cylinder, and to identify that cylinder as firing normally if its corresponding third timing value deviates in the first direction from the reference timing value.

16. The system of claim 15 wherein the control computer is further configured to continually modify for each cylinder having a corresponding third timing value that deviates in the second direction from the reference timing value a current percentage of fuel relative to 100% fueling supplied to that cylinder by a predefined modification percentage up to a fourth percentage of fuel relative to 100% fueling, collect for that cylinder another timing value indicative of a contribution of that cylinder to rotational speed of the engine while controlling the fueling signals to supply the modified percentage of fuel to that cylinder, and to identify that cylinder as firing normally if its another timing value deviates in the first direction from the reference timing value and the modified percentage of fuel relative to 100% fueling deviates in the first direction from a fourth percentage of fuel.

17. The system of claim 16 wherein the control computer is further configured to identify as misfiring any cylinder having its another timing value deviate in the second direction from the reference timing value when the modified percentage of fuel deviates in the second direction from the fourth percentage of fuel.

18. The system of claim 10 wherein the control computer is configured to diagnose cylinder misfiring conditions in the engine only if and while a number of diagnostic enable conditions are satisfied.

19. The system of claim 10 wherein the control computer is configured to reset the percentage of fuel supplied to the cylinders of the engine to default fueling percentage values relative to 100% fueling after diagnosing cylinder misfiring conditions for all cylinders of the engine.

20. The system of claim 10 further including a memory unit;
    and wherein the control computer is configured to store in the memory unit a pass flag for each cylinder identified as firing normally.

21. The system of claim 17 further including a memory unit;

and wherein the control computer is configured to store in the memory unit a fail flag for each cylinder identified as misfiring.

22. A method of diagnosing cylinder misfiring in an internal combustion engine, the method comprising:
   supplying a first percentage of fuel relative to 100% fueling to each cylinder of the engine;
   determining a number of first timing values each indicative of a contribution of a corresponding one of the cylinders to rotational speed of the engine while being supplied with the first percentage of fuel;
   supplying a second percentage of fuel relative to 100% fueling to each cylinder of the engine;
   determining a number of second timing values each indicative of a contribution of a corresponding one of the cylinders to rotational speed of the engine while being supplied with the second percentage of fuel;
   computing a reference timing value as a function of one or more of the number of second timing values; and
   identifying as firing normally any cylinder having a corresponding first timing value that deviates in a first direction from the reference timing value.

23. The method of claim 22 further including executing the method of diagnosing cylinder misfiring in an internal combustion engine only if and while a number of diagnostic enable conditions are satisfied.

24. The method of claim 23 further including determining rotational speed of the engine;
   and wherein one of the number of diagnostic enable conditions corresponds to the rotational speed of the engine being within a predefined speed range.

25. The method of claim 23 further including determining an engine load as a function of engine fueling;
   and wherein one of the number of diagnostic enable conditions corresponds to the engine load being below a maximum engine load value.

26. The method of claim 23 further including determining an accelerator pedal position;
   and wherein one of the number of diagnostic enable conditions corresponds to the accelerator pedal position being in an engine idling position.

27. The method of claim 23 wherein one of the number of diagnostic enable conditions corresponds to a commanded engine speed being at a substantially constant idle reference speed value.

28. The method of claim 23 further including determining a road speed of a vehicle carrying the engine;
   and wherein one of the number of diagnostic enable conditions corresponds to the road speed being less than a predefined road speed value.

29. The method of claim 23 further including determining an operating temperature of the engine;
   and wherein one of the number of diagnostic enable conditions corresponds to the operating temperature of the engine being above a minimum engine operating temperature.

30. The method of claim 23 further including determining an operational status of a power-take-off device driven by either of the engine and a transmission coupled thereto;
   and wherein one of the number of diagnostic enable conditions corresponds to the power-take-off device being inactive.

31. The method of claim 22 wherein the act of computing a reference timing value includes computing the reference timing value as one of an average of, and a predetermined percentage of the average of, at least two of the number of second timing values.

32. The method of claim 31 wherein the act of computing a reference timing value includes computing the reference timing value as one of an average of, and a predetermined percentage of the average of, at least two of the lowest-magnitude ones of the number of second timing values.

33. The method of claim 22 further including storing in memory a pass flag for each cylinder identified as firing normally.

34. The method of claim 22 wherein the act of determining the number of first and second timing values includes:
   sensing engine crankshaft position relative to a reference position and producing an engine position signal corresponding thereto; and
   processing the engine position signal to determine the number of first and second timing values for each cylinder in a cylinder firing order as an elapsed time for the engine crankshaft to rotate through a predetermined crank angle.

35. The method of claim 22 wherein the act of determining the number of first and second timing values includes:
   sensing engine crankshaft position relative to a reference position; and
   processing the position signal to determine the number of first and second timing values for each cylinder as an elapsed time for the engine crankshaft to rotate through a predetermined crank angle relative to rotation time through the predetermined crank angle for a previous cylinder in a cylinder firing order.

36. The method of claim 22 wherein the second percentage of fuel is less than the first percentage of fuel;
   and wherein the first direction is less than the reference timing value.

37. The method of claim 22 wherein the second percentage of fuel is greater than the first percentage of fuel;
   and wherein the first direction is greater than the reference timing value.

38. The method of claim 22 further including identifying for further diagnosis each cylinder having a corresponding first timing that deviates in a second direction, opposite to the first direction, from the reference timing value.

39. The method of claim 38 further including:
   supplying to each of the cylinders identified for further diagnosis a third percentage of fuel relative to 100% fueling;
   determining for each of the cylinders identified for further diagnosis a third timing value indicative of a contribution of that cylinder to rotational speed of the engine while being supplied with the third percentage of fuel; and
   identifying as firing normally each of the cylinders identified for further diagnosis that has a third timing value that deviates from in the first direction from the reference timing value.

40. The method of claim 39 further including executing the following acts for each cylinder having a third timing value that deviates in the first direction from the reference timing value:
   providing a modified fuel percentage corresponding to a current fuel percentage relative to 100% fueling modified by a predefined modification percentage;
   computing another timing value indicative of a contribution of that cylinder to rotational speed of the engine while being supplied the modified fuel percentage;

continually executing the acts of providing the modified fuel percentage and computing another timing value until one of the another timing value deviates in the first direction from the reference timing value and the modified fuel percentage reaches a fourth fuel percentage relative to 100% fueling; and identifying as firing normally each of the cylinders having a corresponding another timing value that deviates in the first direction from the reference value.

41. The method of claim 40 further including identifying as misfiring each of the cylinders having a corresponding another timing value that deviates in the second direction from the reference timing value when the modified fuel percentage deviates in the second direction from the fourth fuel percentage.

42. The method of claim 41 wherein the second percentage of fuel is less than the first percentage of fuel, the third percentage of fuel is greater than the first percentage of fuel and the fourth percentage of fuel is greater than the third percentage of fuel;

and wherein the first direction is less than the reference timing value and less than the fourth predetermined percentage of fuel, and the second direction is greater than the reference timing value and greater than the fourth predetermined percentage of fuel.

43. The method of claim 41 wherein the second percentage of fuel is greater than the first percentage of fuel, the third percentage of fuel is less than the first percentage of fuel and the fourth percentage of fuel is less than the third percentage of fuel;

and wherein the first direction is greater than the reference timing value and greater than the fourth predetermined percentage of fuel, and the second direction is less than the reference timing value and less than the fourth predetermined percentage of fuel.

44. The method of claim 41 further including:

storing in a memory unit a pass flag for each cylinder identified as firing normally; and storing in the memory unit a fail flag for each cylinder identified as misfiring.

45. The method of claim 41 further including resetting the percentage of fuel supplied to the cylinders of the engine to default fueling percentage values after diagnosing cylinder misfiring conditions for all cylinders of the engine.

* * * * *